United States Patent
Ho

[11] Patent Number: 5,949,677
[45] Date of Patent: Sep. 7, 1999

[54] CONTROL SYSTEM UTILIZING FAULT DETECTION

[75] Inventor: John K. Ho, Scottsdale, Ariz.

[73] Assignee: Honeywell Inc., Minneapolis, Minn.

[21] Appl. No.: 08/780,906

[22] Filed: Jan. 9, 1997

[51] Int. Cl.$^6$ .............................. G05B 9/02; G05B 11/01; G05B 13/04; G06F 11/00
[52] U.S. Cl. ............... 364/185; 364/140.04; 364/148.01; 364/150; 364/153; 364/183; 364/184; 364/185; 364/187; 364/724.011; 364/737; 701/8; 701/9; 701/58; 701/59; 701/76; 701/99
[58] Field of Search ................................. 364/184, 185, 364/183, 187, 140.04, 148.01, 150, 153, 724.011, 737; 701/8, 9, 58, 59, 76, 99

[56] References Cited

U.S. PATENT DOCUMENTS

| | | |
|---|---|---|
| 3,632,886 | 1/1972 | Schelber. |
| 4,214,301 | 7/1980 | Kurihara et al. ........................ 364/119 |
| 4,509,110 | 4/1985 | Levesque, Jr. et al. ................ 364/185 |
| 4,669,058 | 5/1987 | Schneider et al. ..................... 364/148 |
| 4,675,804 | 6/1987 | Weimer ................................... 364/161 |
| 4,914,564 | 4/1990 | Surauer et al. ......................... 364/183 |
| 5,170,341 | 12/1992 | Sklaroff .................................. 364/162 |
| 5,233,512 | 8/1993 | Gutz et al. .............................. 364/184 |
| 5,249,119 | 9/1993 | Kaseda et al. .......................... 364/185 |
| 5,254,921 | 10/1993 | Matsubara .............................. 318/561 |
| 5,486,997 | 1/1996 | Reismiller et al. ..................... 364/165 |

Primary Examiner—Reba I. Elmore
Assistant Examiner—Navin Natnithithadha
Attorney, Agent, or Firm—Snell & Wilmer

[57] ABSTRACT

A control architecture having improved fault detection and correction capabilities is disclosed. The system comprises primary and monitor control systems, each having an associated control signal. A fault detector generates an alarm signal based upon differences observed between the primary and monitor control signal. The detector comprises an integrator and a memory means, and alarm signals are generated based upon the total amount of difference observed over a predetermined period of time. In one embodiment of the invention, primary and monitor control signals are averaged to provide a signal that is more fault tolerant than the individual control signals.

23 Claims, 4 Drawing Sheets

CONTROL SYSTEM UTILIZING FAULT DETECTION

BACKGROUND OF THE INVENTION

1. Field of the Invention

The present invention relates to control systems. More particularly, this invention is a control system having a fault detection system that is particularly well-suited for aeronautical and industrial control systems.

2. Description of the Prior Art

Fault detection systems well-known in the prior art monitor the outputs of redundant control systems to ensure control signal integrity and reliability. Referring to FIG. 1, a signal P from a primary control system 11 may be unreliable when it differs significantly from a monitor control signal M generated by a duplicate control system 12, provided that both control systems 11 and 12 receive identical input data. If the primary and monitor systems normally generate identical outputs, differences between outputs P and M may indicate issues with one or both control systems. This difference D, which is equal to P minus M, can be readily computed by summing junction 15 in FIG. 1.

A prior art fault detector 13 generates an alarm signal A whenever primary control signal P differs from monitor control signal M by some critical threshold $T_c$. This alarm signal A notifies plant 14 (which is the system being controlled) that the primary control signal P is potentially unreliable and should be disregarded.

Some difference D between primary control signal P and monitor control signal M is inevitable because of noise and other inaccuracies inherent in mechanical and electrical systems. When setting a critical threshold value $T_c$ for tolerable signal difference, then, it is desirable to select a value that is low enough to isolate all true alarm conditions yet high enough to prevent system noise from generating false alarm signals, called "nuisance trips". In practice, it is very difficult to set an optimal value for $T_c$ that is capable of ignoring brief but high-amplitude noise while detecting prolonged low-amplitude difference D between primary control signal P and monitor control signal M.

Various methods of implementing fault detector 13 are known in the prior art. One method, for example, monitors the difference between the primary and monitor control signals and generates an alarm whenever the difference between the two signals exceeds a magnitude threshold $T_m$ for a period of time $T_t$. While such a system is responsive to low frequency error signals, the system is slow to respond to very high frequency error signals since the error condition must be observed for a period of $T_t$ seconds before triggering an alarm.

An improved fault detection system is disclosed in U.S. Pat. No. 4,509,110 issued to Levesque, Jr. et al. on Apr. 2, 1985, which is hereby incorporated by reference. The Levesque system uses an integrator to monitor the difference between primary and monitor signals over time. When the difference between the primary and monitor signals exceeds a magnitude threshold $T_m$, the integrator increases its output value at a rate equal to the error signal. The system generates an alarm signal when the integrator output exceeds the time-magnitude threshold $T_m$. When the difference between the primary and monitor signals does not exceed $T_m$ (i.e. when the observed error in the system is small or nonexistent), the integrator output gradually decreases to zero at some constant rate. The system therefore considers both the magnitude and the duration of any difference between the primary and monitor control signals. A large difference between the signals will quickly generate an alarm signal, and a smaller difference will generate an alarm if observed for a sufficient period of time.

While the Levesque, Jr., et al. invention provides improvements over other prior art fault detection methods, it is still susceptible to nuisance trips from noise signals having a magnitude greater than the magnitude threshold $T_M$. Nuisance trips may also occur from noise signals that do not instantaneously exceed the noise threshold if such noise signals have sufficient frequency or magnitude to exceed the constant decay rate of the integrator. Because differences between the primary and monitor control signals are flushed from the integrator at a constant rate, large difference signals may remain in the system for a long time.

SUMMARY OF THE INVENTION

It is an object of the present invention to provide an improved fault detection system that accurately and reliably identifies control system discrepancies.

It is a further object of this invention to provide a fault detection system that exhibits improved response time over prior art solutions without any associated increase in nuisance trips.

It is a still further object of this invention to provide a control system that provides useful control data to the plant even when an error condition has been identified.

According to this invention, a redundant control architecture including primary and monitor control systems is provided, with each control system generating a control signal. The difference between the two control signals is monitored by a fault detection system. The fault detection system comprises an integrator and a memory means capable of recording signal differences for a predetermined period of time. The use of memory allows signal differences to be added to the integrator and subtracted at a later time. The fixed decay rate required by the prior art is thereby eliminated, since all signals are flushed from the system after the pre-determined period. By using a memory device to monitor the actual error contained in the system, the fault detector of the present invention can monitor even very high frequency error signals that may not have sufficient duration to generate alarm signals on prior art fault detectors. Moreover, the detector provides more accurate results than prior art detectors since no assumptions need to be made about error decay rates. All error signals are flushed out of the integrator after a pre-determined period of time.

In one embodiment of the present invention, the plant is controlled by signal equal to the average of the primary and monitor signals. By combining the two signals into one control signal, the plant will receive reasonably accurate control information even when a fault condition in one of the control systems has been identified.

The above and other objects, features, and advantages of the present invention will become apparent from the following detailed description of illustrative embodiments thereof to be read in conjunction with the accompanying drawings, in which like reference numerals are used to identify the same or similar parts in the similar views.

DETAILED DESCRIPTION OF THE PREFERRED EMBODIMENT

Figure 2:
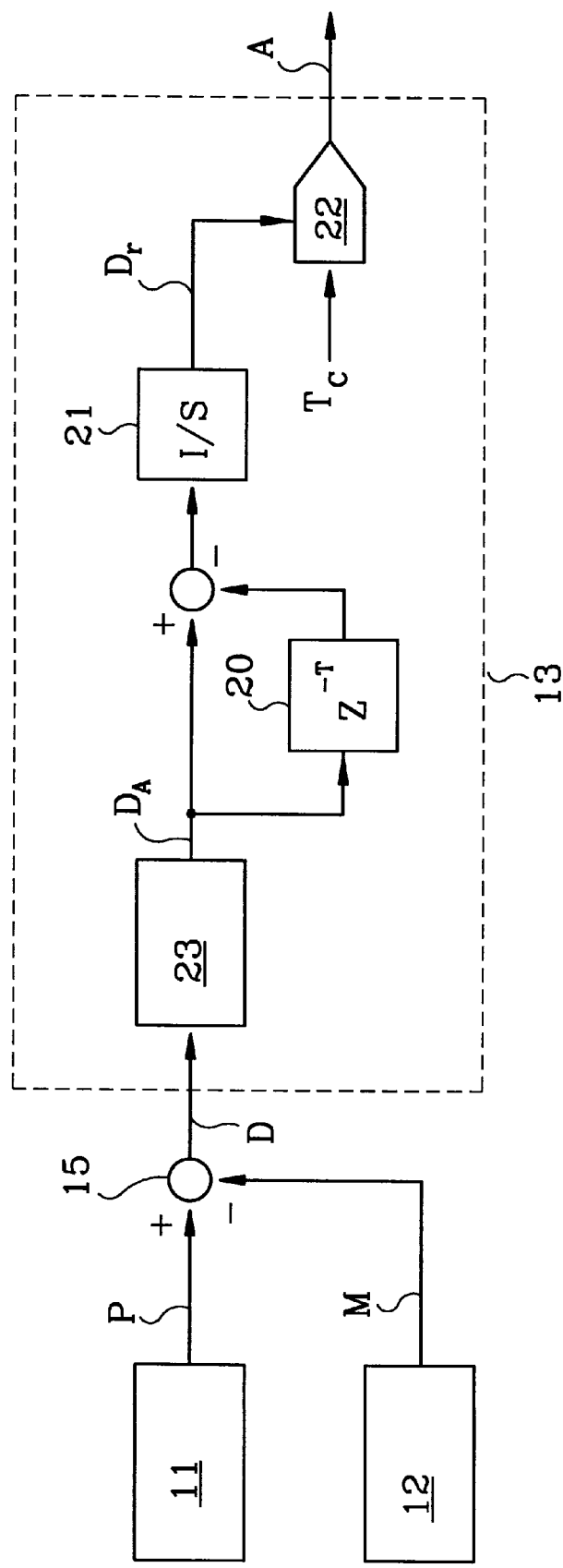
FIG. 2 is a block diagram of a fault detection system according to the present invention._

Referring to FIG. 2, a block diagram of an improved fault detector is disclosed. The fault detector 13, which is typically implemented in a digital computer, receives the difference D between a primary control system signal P and a monitor signal M. Alternatively, M could be the output of a model or simulation. In either case, signals P and M are fed to a summing junction 15 that calculates the difference between the two signals and produces difference signal D, where D=P−M.

Because the difference D between the primary and monitor control signals P and M may change with time, multiple observations of difference signal D are retained in the control system as described below. Difference signal D is typically sampled at a constant frequency, but may also be sampled on an asynchronous basis, or according to any other sampling scheme.

Each difference signal D is passed through a filtering mechanism 23 contained within fault detector capable of generating an absolute difference signal $D_A$ corresponding to the absolute difference between difference signal D and a magnitude threshold $T_m$. In algebraic terms, $D_A=[abs(D)-T_m]$ where $D_A$ is preferably upper bounded by a maximum value $T_{max}$. This limited difference value $D_A$ corresponds to the amount of critical difference between primary control signal P and monitor control signal M at a given point in time. Magnitude threshold $T_m$ is unique for each control system implemented, and is determined according to the amount of noise inherent in the system, since values of difference signal D that are less than magnitude threshold $T_m$ will be ignored by the fault detector. Magnitude threshold $T_m$ is also dependent upon the level of fault sensitivity desired.

FIG. 3 shows three alternate embodiments of filtering mechanism 23. Each embodiment comprises several signal filters, each of which is fully described in the prior art. The order in which difference signal D passes through the signal filters is not critical, and may be changed without affecting the performance of the fault detector or the control system.

Figure 3A:
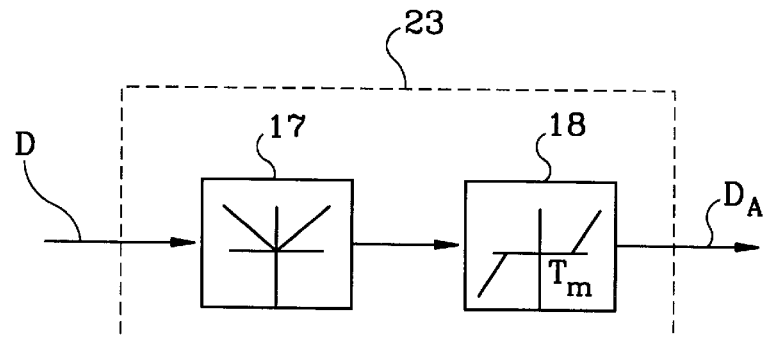
FIG. 3A is a block diagram of a first embodiment of a filtering mechanism.

As shown in FIG. 3A, filtering mechanism 23 preferably includes an absolute value function 17 and a deadband filter 18 to produce absolute difference signal $D_A$ as shown in FIG. 3A. Deadband filter 18 passes only the portion of the difference signal D that exceeds magnitude threshold $T_m$.

Figure 3B:
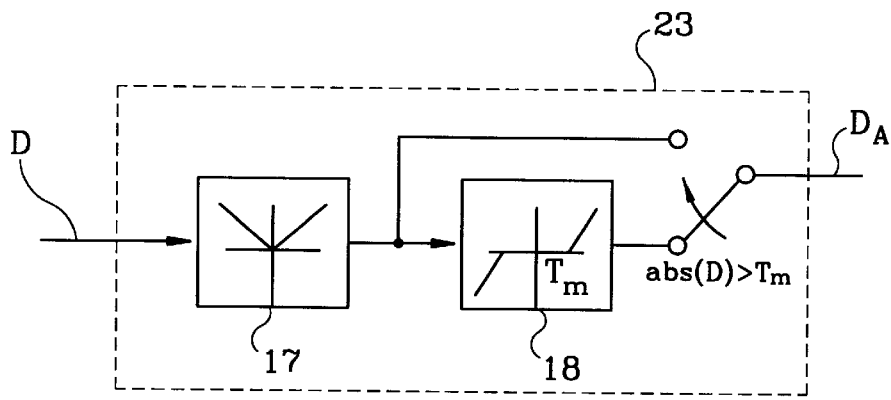
FIG. 3B is a block diagram of a second embodiment of a filtering mechanism.

Alternatively, the output of absolute value filter 17 may bypass deadband filter 18 as shown in FIG. 3B. In such an embodiment, deadband filter 18 does not manipulate difference signal D, but merely acts as a control gate, passing difference signal D only when its absolute value exceeds magnitude threshold $T_m$.

Figure 3C:
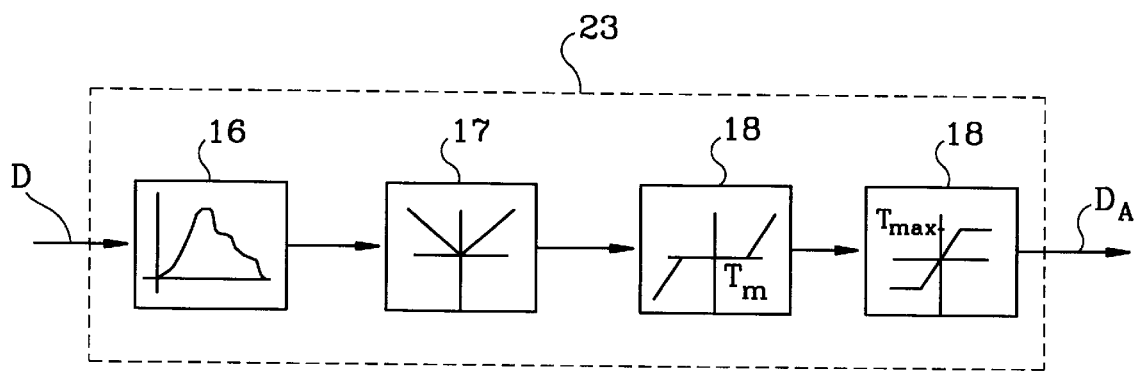
FIG. 3C is a block diagram of a third embodiment of a filtering mechanism.

In the preferred embodiment of filtering mechanism 23 shown in FIG. 3C, a prior art frequency shaping filter 16 and a prior art signal limiter 19 are added to the filtering scheme of FIG. 3A or FIG. 3B. It is well known that difference signals D having various frequencies often vary significantly in magnitude in accordance with the frequency response of the control system. Because the fault detector 13 reacts differently to signals of different frequencies, it can be difficult to tune the fault detector 13 to provide optimum response at all frequencies encountered. Difference signal D may therefore be provided to a frequency shaping filter 16 to provide a standard output magnitude to which the fault detector 13 can be tuned. Frequency shaping filters such as an inverted notch filter are optimized to the particular control system implemented, and are well-known in the art. If a frequency shaping filter 16 is not used, then magnitude threshold $T_m$ should be lowered. Decreasing the value of magnitude threshold $T_m$, however, increases the probability of nuisance trips.

The preferred embodiment shown in FIG. 3C also includes an optional limiter 19 capable of capping the absolute difference $D_A$ at some finite value $T_{max}$. Limiter 19 ensures that very large but very brief difference signals D that are characteristic of system noise do not trigger an undesired alarm.

Referring again to FIG. 2, a memory 20 is provided to retain observations of $D_A$ received from filtering mechanism 23. By retaining multiple values of $D_A$ in memory 20, system performance may be monitored over a period of time. Memory 20 may preferably be implemented on a digital computer as a memory stack structure that is initialized to a zero state (i.e. to indicate the absence of any initial absolute difference). Because memory 20 must retain the total amount of control signal difference observed in the system over a period of T seconds, the stack must be of sufficient size to store all values of $D_A$ received from filtering mechanism 23 during a period of T seconds.

Absolute difference signals $D_A$ are simultaneously provided to an integrator 21 and stored in memory 20 for a period of T seconds. After a signal $D_A$ has been stored in memory for T seconds, the signal is removed from memory 20 and subtracted from integrator 21. Each observation of absolute difference $D_A$ is therefore retained in the fault detector 13 for exactly T seconds: each value is added to integrator 21 when observed, and then subtracted out after a delay of T seconds. Because the values added and subtracted from integrator 21 are equal (although shifted in time), the output $D_T$ of the integrator 21 always reflects the total amount of absolute difference observed by fault detector 13 over the past T seconds. There is never a need to reset or to otherwise manually flush the values contained in integrator 21, since any signal added to the integrator will be subtracted out T seconds later. The total absolute difference $D_T$ retained by integrator 21 therefore reflects the exact and entire amount of absolute difference observed in the system for the past T seconds. The value $D_T$ can therefore be compared against a time magnitude threshold $T_c$ in comparator 22, which in turn generates an alarm signal A if the total absolute difference $D_T$ exceeds the threshold amount (i.e. if $D_T>T_c$).

Figure 1:
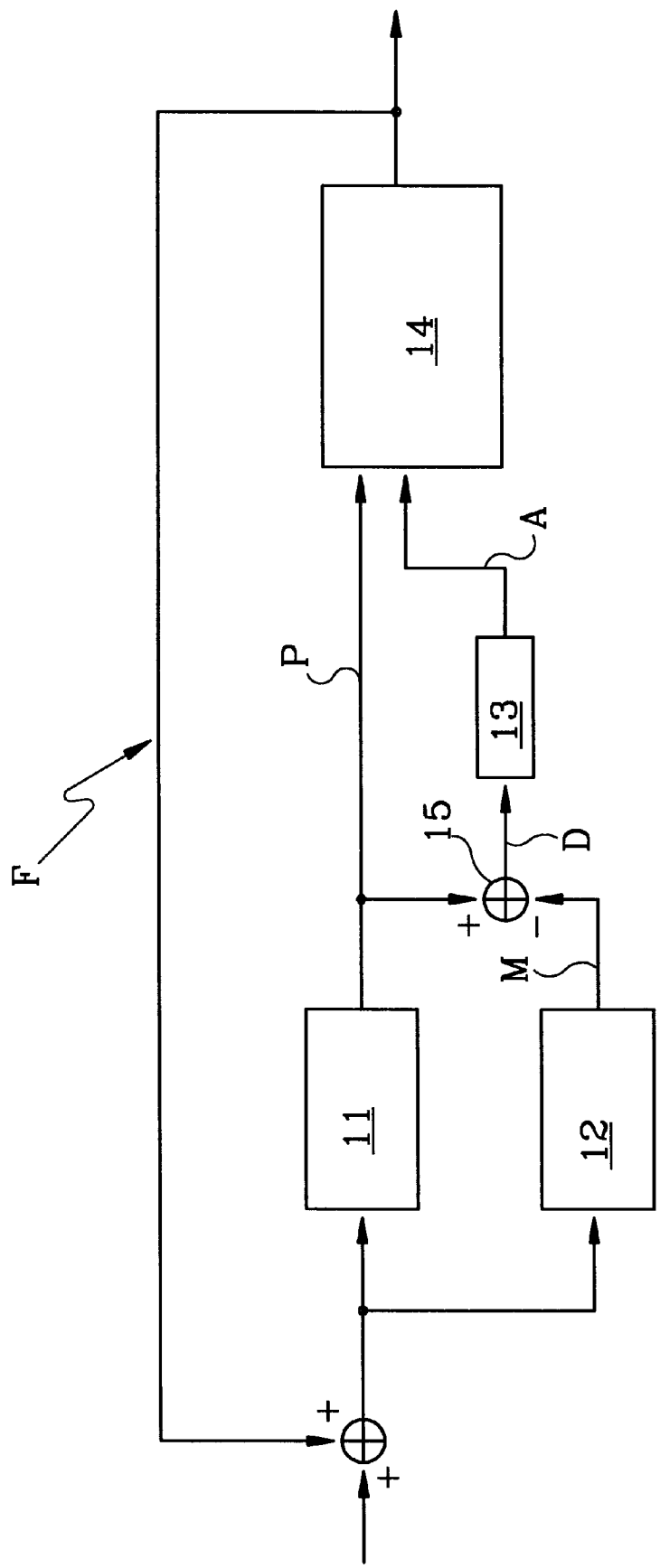
FIG. 1 is a block diagram of a prior art control system having fault detection.

The fault detector 13 of FIG. 2 can easily be implemented in the prior art control system of FIG. 1, wherein plant 14 is controlled by primary control signal P unless an alarm signal A is generated by fault detector 13. Feedback signal F provides plant response information to primary and monitor control systems 11 and 12. If primary control system 11 is a mechanical or electrical apparatus and monitor control system 12 is implemented as a mathematical model, for example, such an arrangement may be desirable. If the primary and monitor control systems 11 and 12 are comprised of identical hardware, however, it may be advantageous to control the plant with both primary control signal P and monitor control signal M. An effective way to implement a truly redundant control system is to average the primary and monitor control signals and to use the average of these two signals as an input to the plant. Because signals P and M are unlikely to fail at the same time, an averaged signal is likely to be at least partially accurate even in the event of a single channel failure. An averaged-signal control system provides greater tolerance to faults over the prior art because even if an alarm condition is identified by the fault detector, the averaged control signal is still likely to be reliable enough to control the plant for a short period of time. If the plant relied upon a single primary control signal, an alarm condition could render the plant inoperable.

Figure 4:
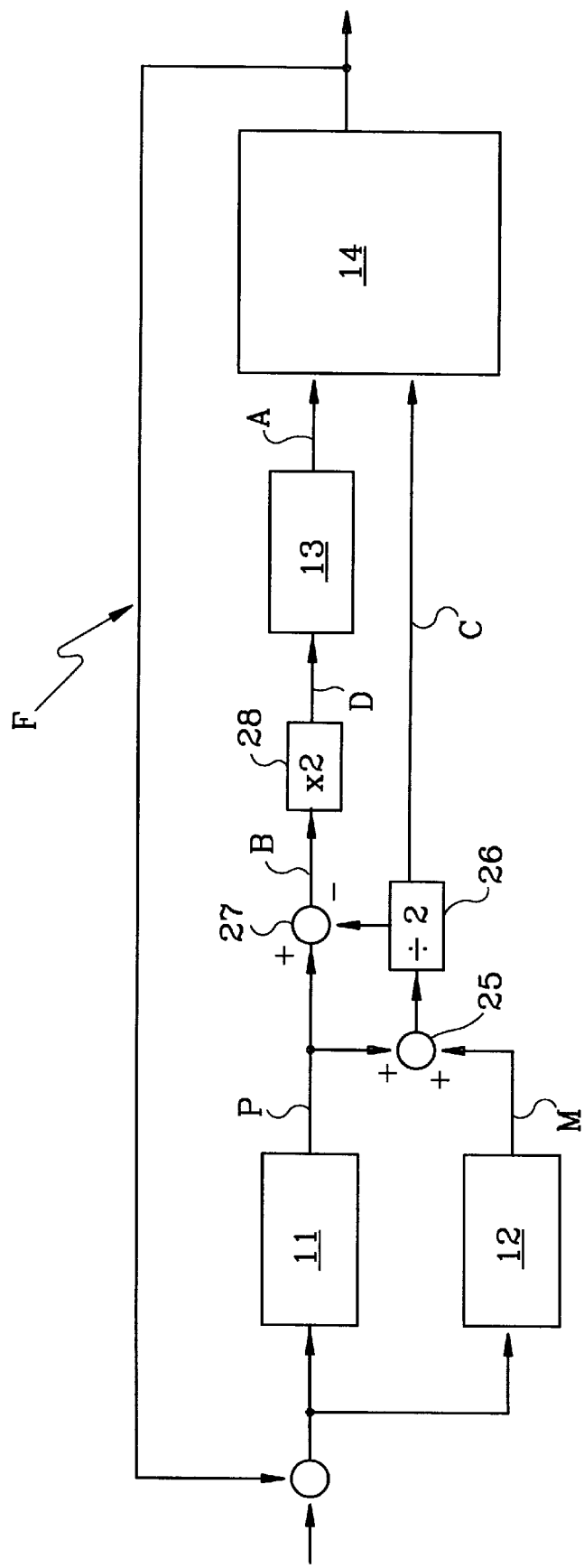
FIG. 4 is a block diagram of the control system of the present invention.

Referring now to the block diagram of FIG. 4, an averaged-signal control system is disclosed. A primary control system and monitor control system provide primary and monitor control signals that are added by summing junction 25. The resulting sum P+M is provided to a divider 26 to produce an average of the two control signals that can be provided to the plant 14 for use as a control signal. This averaged control signal C, which is equal to [(P+M)/2], can also be subtracted from the primary control signal P at a second summing junction 27 to produce a signal B equal to one-half the difference between the primary and monitor control signals P and M. Stated algebraically, B=[P−(P+M)/2]=[(P−M)/2]. Multiplier 28 may then multiply signal B by 2 to produce signal D equal to P−M, the difference between the control signals. This difference D may then be used as an input to fault detector 13. Fault detector 13 is preferably in accordance with FIG. 2 described above, but any prior art fault detector may be used that accepts a difference between two control signals as input and generates an alarm signal A as an output. As in the control system of FIG. 1, feedback signal F provides plant response information to primary and monitor control systems 11 and 12.

The corresponding structures, materials, acts and equivalents of all means or step plus function elements in the claims below are intended to include any structure, material, or acts for performing the functions in combination with other claimed elements as specifically claimed. The scope of the invention should be determined by the appended claims and their legal equivalents, rather than by the examples given.

What is claimed is:

1. An apparatus for controlling a plant comprising:
   a primary control system having a primary control signal;
   a monitor control system having a monitor control signal;
   a plurality of difference signals, each difference signal corresponding to the difference between said primary control signal and said monitor control signal at a fixed point in time; and
   a fault detector comprising:
      a filter transforming each of said difference signals into absolute difference values corresponding to the absolute difference between each of said difference signals and a magnitude threshold;
      a memory storing each of said absolute difference values for at least a pre-determined period of time; and
      an integrator in communication with said memory, said integrator maintaining a running accumulation of the absolute difference values observed during only the pre-determined period of time.

2. The apparatus of claim 1 further comprising means for computing an average of said primary control signal and said monitor control signal, wherein said average is provided to the plant.

3. The apparatus of claim 1 wherein said filter comprises a deadband filter.

4. The apparatus of claim 3 wherein said filter further comprises an absolute value function.

5. The apparatus of claim 4 wherein said filter comprises a signal limiter.

6. The apparatus of claim 5 wherein said filter comprises a frequency shaping filter.

7. The apparatus of claim 1 wherein said fault detector is implemented in a digital computer.

8. The apparatus of claim 7 wherein said filter is implemented in a digital computer.

9. The apparatus of claim 1 wherein the integrator computes the total of the absolute difference values observed over only a predetermined period of time by adding each absolute difference value substantially at the fixed point in time and by subtracting each difference signal after the pre-determined period of time has elapsed.

10. A method of detecting faults in a control system, the method comprising the steps of:
    determining differences between a primary control signal and a monitor control signal at regular time intervals;
    determining absolute differences between the differences and a threshold value;
    adding said absolute differences to a total absolute difference signal;
    retaining each of said absolute differences in a memory for at least a pre-determined period of time;
    subtracting each of said absolute differences from said total absolute difference signal after said predetermined period of time has expired; and
    providing an alarm signal when said total absolute difference signal exceeds a maximum allowable difference value.

11. The method of claim 10 further comprising the step of averaging said primary control signal and said monitor control signal to generate an input to a plant.

12. The method of claim 10 further comprising the step of filtering said differences prior to retaining said differences in said memory.

13. The method of claim 11 further comprising the step of filtering said differences prior to retaining said differences in said memory.

14. A method of controlling a plant comprising the steps of:
    providing a primary control signal (P) and a monitor control signal (M);
    averaging the primary control signal and the monitor control signal to produce an average control signal that is provided to the plant;
    subtracting said average control signal from said primary control signal to obtain a resultant signal substantially equal to (P−M)/2; and
    multiplying said resultant signal by two to obtain an error signal substantially equal to P−M.

15. The method of claim 14 further comprising the step of providing said error signal to a fault detector.

16. The method of claim 15 wherein said fault detector comprises an integrator and a memory means.

17. The method of claim 16 further comprising the steps of:
    determining absolute differences between the error signal and a threshold value at discrete points in time;
    adding said absolute differences to a total absolute difference signal at the integrator;

retaining each of said absolute differences in the memory for at least a pre-determined interval;

subtracting each of said absolute differences from said total absolute difference signal after said predetermined interval has expired; and providing an alarm signal to the plant when said total absolute difference signal exceeds a maximum allowable difference value.

18. An apparatus for controlling a plant comprising:

a primary control system having a primary control signal;

a monitor control system having a monitor control signal;

a plurality of difference signals, each difference signal being related to the difference between the primary control signal and the monitor control signal at a fixed point in time; and a fault detector having an integrator, the integrator maintaining a representation of the total of the difference signals observed over only a pre-determined interval, the fault detector providing an error signal to the plant when the total of the difference signals exceeds a threshold value.

19. The apparatus of claim 18 wherein the fault detector further comprises a memory in communication with the integrator, wherein the memory retains each difference signal for at least the pre-determined interval.

20. The apparatus of claim 19 wherein the integrator computes the total of the difference signals observed over only a predetermined interval by adding each difference signal substantially at the fixed point in time and by subtracting each difference signal after the pre-determined interval has elapsed.

21. The apparatus of claim 18 wherein the plurality of difference signals are computed by filtering logic.

22. The apparatus of claim 21 wherein each of the plurality of difference signals are absolute difference signals substantially related to the difference between the primary control signal and the monitor control signal minus a second threshold value.

23. The apparatus of claim 18 further comprising a hybrid control signal that is provided to the plant, the hybrid control signal being substantially equal to the average of the primary control signal and the monitor control signal.

* * * * *